United States Patent [19]
Hogan

[11] 3,936,884
[45] Feb. 3, 1976

[54] MAGNETIC TAPE HEAD WITH CLAMPED CORE HOLDERS

[75] Inventor: John W. Hogan, Golden Valley, Minn.

[73] Assignee: MagTech Industries, Inc., Minneapolis, Minn.

[22] Filed: July 3, 1974

[21] Appl. No.: 485,541

[52] U.S. Cl. ............................ 360/125; 360/129
[51] Int. Cl.² .................... G11B 5/10; G11B 5/28
[58] Field of Search .......... 360/125, 129, 128, 124, 360/137

[56] References Cited
UNITED STATES PATENTS

| | | | |
|---|---|---|---|
| 2,621,259 | 12/1952 | Grantham | 360/125 |
| 3,311,711 | 3/1967 | Maryatt et al. | 360/125 |
| 3,495,048 | 2/1970 | Gooch | 360/129 |
| 3,508,229 | 5/1970 | Stencel, Jr. et al. | 360/129 |
| 3,590,168 | 6/1971 | Gooch | 360/129 |
| 3,744,040 | 7/1973 | Honegger et al. | 360/129 |
| 3,767,209 | 10/1973 | Seehawer | 360/129 |

Primary Examiner—Alfred H. Eddleman
Attorney, Agent, or Firm—Williamson, Bains & Moore

[57] ABSTRACT

A magnetic tape head includes a pair of core holders containing the core elements of magnetic cores. The tips of the magnetic cores are urged towards each other when the core holders are clamped in abutting relation by a metallic U-shaped clip. The bight portion of the clip engages the tips of the magnetic cores and engages the inner surface of the metallic housing in which the core holders are positioned to ground the tips of the cores. The legs of the clip are urged inwardly with a scissors action by engagement with the inner surfaces of the housing to further exert a clamping action on the core holders and to thereby urge the tips of the core elements towards each other so that the flux gap is maintained.

8 Claims, 4 Drawing Figures

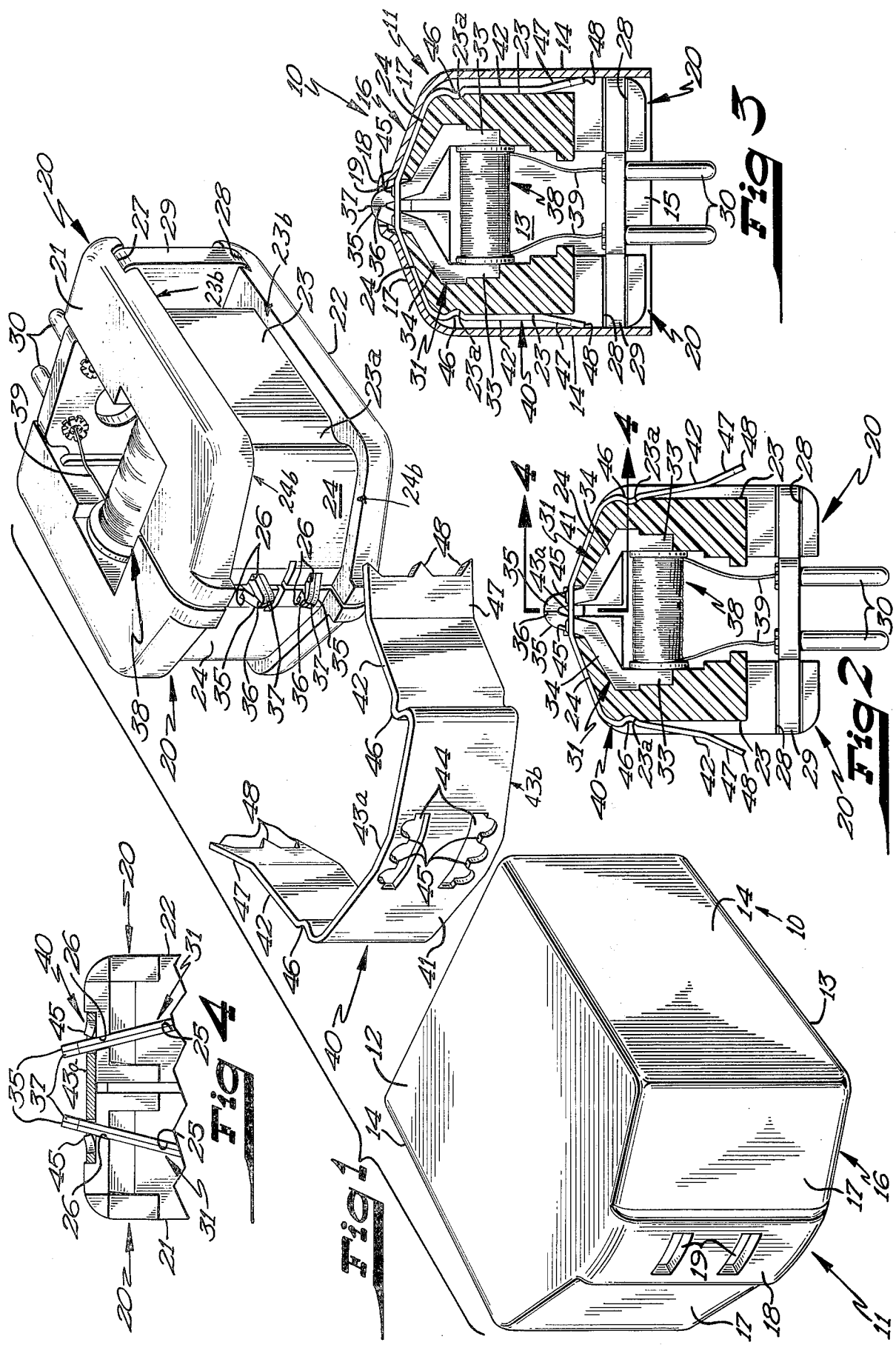

3,936,884

MAGNETIC TAPE HEAD WITH CLAMPED CORE HOLDERS

FIELD OF THE INVENTION

This invention relates to magnetic tape heads and more specifically to means for clamping the core holders of the magnetic tape heads in clamped assembled relation.

SUMMARY OF THE INVENTION

In conventional magnetic tape heads, the magnetic cores are comprised of core elements which are mounted in a pair of core holders. The core holders are clamped together and are positioned within a magnetic tape housing. The core holders are typically secured together by screws, rivets and in some instances, spring clips are used. When spring clips are employed, such as shown in U.S. Pat. No. 3,484,562, two spring clips are applied to the sides of the core holders and the clamping force is exerted by the converging ends of each clip. The ends of the legs of these prior clips exert a pincher action on the core holders so that the force vectors produced thereby lie in a pair of planes that extend in a fore and aft direction with planes that extend in a fore and aft direction with respect to the assembled head. This type of prior art clip, which functions only as a clamping means, exerts its maximum clamping action on the core holder as soon as it is applied to the core holders.

It is therefore a general object of this invention to provide a novel multi-functional clip for a magnetic tape head for clamping the core holders together so as to provide and maintain the proper flux gap at the magnetic core tips.

The novel clip is of U-shaped configuration and includes diverging legs which produces a scissor-like clamping action on the assembled core holders when the latter are urged into the magnetic tape housing.

The legs of the U-shaped clip are provided with detents that extend transversely of the core holder so that the clamping action is exerted by the clip at optimal locations for producing and maintaining the desired flux gap at the core tips.

It is also an object of this invention to provide a novel clip which engages and grounds the core tips through the magnetic tape head housing thereby obviating the need for a separate grounding means.

These and other objects and advantages of this invention will more fully appear from the following description made in connection with the accompanying drawings wherein like reference characters refer to the same or similar parts throughout the several views.

FIGURES OF THE DRAWINGS

FIG. 1 is an exploded perspective view of the major components of the magnetic tape head;

FIG. 2 is a cross-sectional view of a pair of core holders and associated cores clamped in assembled relation before insertion into the magnetic tape head housing;

FIG. 3 is a cross-sectional view of the core holder in an assembled condition and inserted into the magnetic tape head housing and;

FIG. 4 is a cross-sectional view taken approximately along line 4—4 of FIG. 2 and looking in the direction of the arrows.

DESCRIPTION OF THE PREFERRED EMBODIMENTS OF THE INVENTION

Referring now to the drawings, and more specifically to FIG. 1, it will be seen that the magnetic tape head, designated generally by the reference numeral 10 is there shown. The magnetic tape head 10 comprises a metallic shell or housing 11 which is generally rectangular or of parallelepiped configuration. The housing 11 includes a substantially flat upper wall 12, lower wall 13, opposed side walls 14 and an open rear end 15 and a front wall 16. It will be noted that the front wall 16 is of generally convex configuration and includes converging lateral portions 17 and a forwardly offset substantially flat central portion 18. The flat central portion 18 has a pair of vertically spaced apart elongate openings or windows 19 therein.

The tape head 10 also includes a pair of core holder members 20 formed of a suitable nonconductive dialectric material each being the mirror image of the other. Each of the core holder members 20 includes a substantially flat upper wall 21, a substantially flat lower wall 22, a vertical side wall 23, and a front wall 24 that projects inwardly and forwardly at an angle with respect to the side wall. The front wall and side wall of each core holder member is inwardly recessed so that a pair of vertically spaced apart shoulders 23b are defined along the upper and lower edges of the sides of each core holder member. Similarly, a pair of vertically spaced apart shoulders 24b are defined along the upper and lower edges of the front wall of each core holder. It will be also noted that each side wall 23 has a vertically extending generally arcuate groove 23a therein adjacent the associated front wall thereof.

Each of the core holder members 20 has a pair of continuous slots 25 in the inner surface of the side and front walls thereof. In the embodiments shown, the slots are vertically spaced apart and those portions of the slots formed in the inner surface of each front wall converge towards each other, as best seen in FIG. 4, and communicate with slots in the front wall. It will also be seen that the inner or lower surface of the upper wall 21 of each core holder has a downwardly facing transverse slot 27 therein and the upper and inner surface of each lower wall 28 of each core holder has an upwardly facing transversely extending slot 28 therein. When the core holders are assembled in abutting relation, the slots 27 in the respective core holders will be disposed in aligned relation as will be the slots 28 therein. These slots accommodate a substantially flat generally rectangularshaped plug block 29, the latter having male electrical connector elements 30 which are adapted to be connected to a suitable female jack connector.

The core holder members 20 provide the support means for magnetic cores. In the embodiments shown, the magnetic tape head is comprised of a pair of such magnetic cores, although the scope of the present invention shall include magnetic tape heads which includes only a single magnetic core. Each magnetic core is comprised of a pair of substantially identical core elements 31 formed of a suitable ferrous or magnetic material, and each core element including a rear leg 32, a web portion 33 and a front leg 34. The web portion 33 and the front leg 34 of each core element is positioned within one of the continuous slots 25 of a core holder member 20. Each front leg 34 projects through a recess 26 in the front wall of each core holder member and terminates in a substantially flat tip 35. When the core holders are in the assembled condition, the flat tips 35 are urged towards each other, but will be spaced apart by a suitable insulator gap material 37 which defines the desired flux gap 36. The rear legs of a pair of opposed core elements project into an electromagnetic coil 38 and the end portions 39 of the conductor which forms the coil are connected to a pair of the male connector elements 30. Thus it will be seen that when the core holders are assembled, eaach of the magnetic cores when energized will function as a magnetic circuit in a well-known manner.

The means for clamping the core holder members together in abutting relation to produce and maintain the proper magnetic flux at the magnetic tips of the magnetic cores comprises a generally U-shaped spring clip 40. The U-shaped clip 40 is formed of a suitable metallic conductive resilient material and includes a bight or web 41 and a pair of legs 42 integral with the bight and converging outwardly therefrom. It will be noted that the bight 41 is comprised of a substantially flat central portion 43a and a pair of diverging lateral portions 43b. It will also be noted that the lateral portions 43b constitute the major portion of the overall length of the bight 41. The central portion 43a has a pair of vertically spaced apart elongate openings 44 therein, the edge defining each opening being shaped to define a plurality of core engaging teeth 45.

Each of the leges includes an inwardly projecting arcuate locking and pressure applying detent 46, each detent adapted to be positioned in one of the grooves 23a of each core holder member. It will be noted that the detent 46 for each leg is located adjacent the bight 41 and that each leg then diverges outwardly and terminates in substantially flat terminal portions 47. The terminal portions 47 are provided with teeth 48 at their respective ends, as best seen in FIG. 1.

When a magnetic tape head is assembled, the core elements of the cores will be positioned within the slots of each core holder member and the electromagnetic coils will be positioned over the rear legs of a pair of core elements. When clip 40 is appropriately attached, the oppositely disposed core holder members will be maintained in abutting relation. The plug block 29 will be positioned within the slots in the respective core holder members. When clip 40 is applied to the core holder members the detents 46 are positioned in the grooves 23a of the side walls 23.

It will be noted that when the core holder members 20 are disposed in abutting relation, the front walls 24 thereof present a convex front face and the bight 41 of the clip 40 is of correspondingly convex configuration. With this arrangement, the bight 41 of the clip 40 will be positioned against the front face of the core holder member and the tips of the magnetic cores will project outwardly through the openings 44 in the bight. The teeth 45 defined by one opening 44 will engage the upper surfaces of the front legs of each core element, and the teeth defined by the the other opening will engage lower surfaces of the front legs to establish good electrical contact therewith. The spacing between the detents 46 is such that it is necessary to urge the detents apart when the clip is applied to the core holder members. Thus the detents serve to hold the clamped core holder members in assembled abutting relation when the clip is applied to the core holder members.

The assembled core holder members with the clip applied thereto are then inserted into the metallic housing 11 until the core tips project through the openings 19 in the front wall thereof. When this occurs, the legs 42 of the clip will be urged inwardly and this produces a scissor-like clamping action at the detents 46 upon the core holder members to thereby urge the core tips towards each other. It will therefore be seen that the present invention takes advantage of the final step in assembling magnetic tape heads to produce additional clamping action. The teeth 48 located at the outer ends of the legs of the clip will engage the inner surface of the side walls 14 of the housing 11 with penetrating effect, thus establishing good electrical contact therewith. With this arrangement, it will be seen that the magnetic cores are very effectively grounded through the housing 11 thereby facilitating electrostatic shielding. It will be noted that the location of the force vectors exerted by the detents 46 of the clip is optimal for producing the desired flux gap at the core tips.

It will also be noted that when the clip 40 is applied to the core holder members, the bight and the major portions of the legs will be positioned against the recessed front and side walls of the core holder members and between the peripheral shoulders so that only the rear or outer ends of the legs contacts the interior surface of the housing 11.

Although in the embodiment of the magnetic head disclosed, only a pair of core elements are provided, it is within the scope of the present invention to provide the magnetic head with a plurality of core elements for use with a multi-track magnetic tape. It is also pointed out that a single track magnetic head is within the scope of the present invention.

From the foregoing description, it will be seen that I have provided a novel multifunctional clip which not only serves to clamp the core holder members of the magnetic tape head in assembled abutting relation, but also serves to effectively ground the magnetic cores to the magnetic tape head housing. It will further be noted from the preceding paragraphs that the novel clip takes advantage of a final conventional assembly step by coacting with the magnetic tape housing to exert maximum clamping force at optimal locations for producing the proper magnetic flux gap at the core tips.

Thus it will be seen that I have provided a magnetic tape head with a novel clamping clip which is not only of simple and inexpensive construction, but one which functions in a more efficient manner than any heretofore known comparable device.

What is claimed is:

1. A magnetic tape head comprised of
   a magnetic core including a pair of magnetic core elements, each core element having a tip,
   a pair of similar core holder members formed of nonconductive material and each member engaging and supporting said magnetic core elements,
   a generally U-shaped resilient clip formed of a conductive material and engaging and clamping said core holders in abutting engagement, and urging the tips of said core elements towards each other to form an electromagnetic circuit, said clip including a bight portion and a pair of symmetrical legs integral therewith diverging outwardly therefrom, said bight portion engaging said core elements adjacent said tips,
   a housing formed of a conductive material and having an open end and a closed end, an opening in said closed end, said core holder being positioned interiorly of said housing so that said core tips project exteriorly through the opening in the closed end thereof, the legs of said clip having outer ends engaged by the inner surface of said housing to ground said magnetic cores and to urge the legs inwardly with scissors action to thereby increase the clamping action on the core holders and to further urge the tips of the magnetic core towards each other.

2. The magnetic tape head as defined in claim 1 wherein said core holder members when disposed in abutting relation presenting a convexed end having slots therein through which said magnetic tips project, the bight portion of said clip engaging said convex ends of the abutting core holder members.

3. The magnetic tape head as defined in claim 1 wherein the exterior surfaces of said core holders are recessed to define peripheral shoulders, the bight portion and legs of said clip being positioned within said recessed surfaces thereby only the ends of said legs engage the housing.

4. The magnetic tape head as defined in claim 1 wherein the bight portion of said clip has an opening therein, and wherein the tips of said magnetic core projects through and engage the edges of said clip defined by said opening in the bight portion thereof.

5. The magnetic tape head as defined in claim 4 wherein said opening has teeth defined by an edge thereof which engages the tip portions of the core elements with penetrating effect.

6. The magnetic tape head as defined in claim 1 wherein the exterior of each core holder member has a transverse groove therein, each leg of said clip having an inwardly convex detent adjacent said bight portion, said convex detent of each leg being positioned in the transverse groove of each core holder member when the clip is applied to the core holder members.

7. The magnetic tape head as defined in claim 1 wherein the outer ends of the legs of said clip have teeth formed thereat for engaging the inner surface of the housing with penetrating effect.

8. A magnetic tape head comprised of
a pair of magnetic cores each comprising a pair of magnetic core elements, each core element having a tip,
a pair of similar core holder members formed of nonconductive material and each member engaging and supporting a pair of said magnetic core elements,
a generally U-shaped resilient clip formed of a conductive material and engaging and clamping said core holders in abutting engagement, and urging the tips of a pair of core elements towards each other to form an electromagnetic circuit, said clip including a bight portion and a pair of legs integral therewith diverging outwardly therefrom, said bight portion engaging said core elements adjacent said tips,
a housing formed of a conductive material and having an open end and a closed end, a pair of openings in said closed end, said core holder being positioned interiorly of said housing so that said core tips project exteriorly through the openings in the closed end thereof, the legs of said clip having outer ends engaged by the inner surface of said housing to ground said magnetic cores and to urge the legs inwardly with scissors action to thereby increase the clamping action on the core holders and to further urge the tips of the magnetic cores towards each other.

* * * * *